Patented Feb. 6, 1951

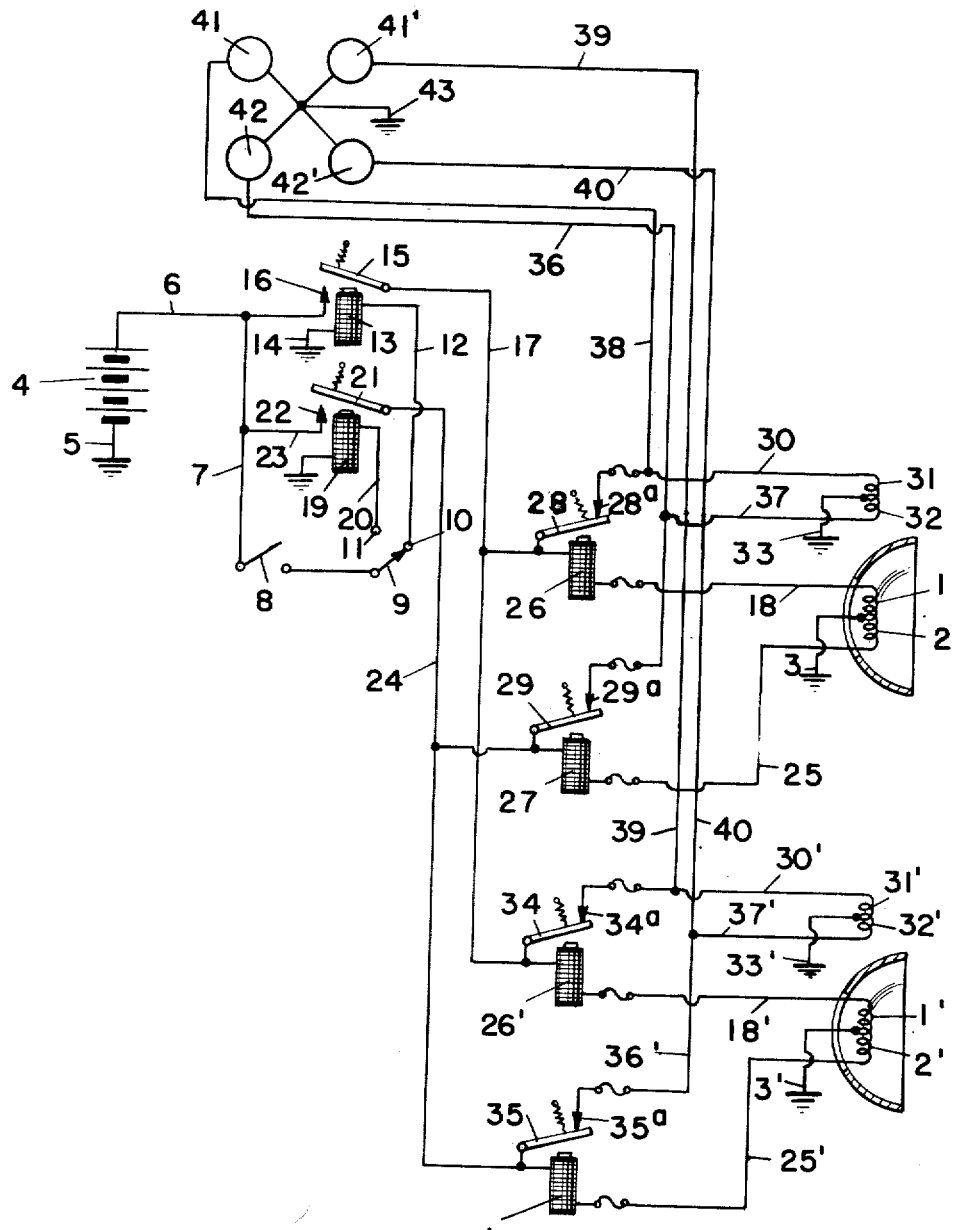

2,540,410

UNITED STATES PATENT OFFICE 2,540,410

AUTOMOBILE LIGHTING SIGNAL SYSTEM

John R. Wagner, Clarion, Pa.

Application September 24, 1948, Serial No. 51,031

2 Claims. (Cl. 315—83)

This invention relates to electric lighting systems for automobiles.

As is well known, it frequently happens that one of the headlights burns out or otherwise fails, thus leaving the car with but a single headlight. This creates a highly dangerous condition, confusing to an approaching motorist, because he cannot tell with certainty on which side of the oncoming car the single headlight is located.

An object of the invention is to prevent the occurrence of such a dangerous condition by providing means for automatically exhibiting a signal light adjacent either headlight, in case of failure of the headlight.

A further object is to provide signal lamps on the dash, operated simultaneously with the headlight signals, so as to warn the driver that a headlight has failed, and to indicate to him which particular headlight is out.

A still further object of the invention is to devise a signal system of the above character which is adapted to be employed with standard car lighting systems now in common use and comprising headlights equipped with high and low beam filaments, and the usual relays, governed by the customary tilt switch, for controlling the supply of current to such filaments.

To this end, the invention contemplates the provision of separate signal means adjacent each headlight, and individual signal lamps on the dash, both controlled by the tilt switch and responsive respectively to the failure of either the high beam or low beam circuits of the headlights.

In order that the invention may be readily understood, reference is had to the accompanying drawing, forming part of this specification, in which drawing the single figure is a diagram illustrating the circuits embodying the invention.

Referring to the drawing in detail I have illustrated the usual two headlights having high beam filaments 1 and 1' and low beam filaments 2 and 2', these filaments being joined together and their junctions grounded at 3 and 3'.

The usual battery is indicated at 4, one side of which is grounded as at 5. From the other side of the battery extend conductors 6 and 7 to the usual dash switch 8, connected in series with the customary tilt switch 9. The latter is constructed to selectively engage contacts 10 and 11. When in engagement with contact 10 as shown in the drawing, and when the dash switch 8 is closed, current flows from the battery 4 through wires 6 and 7, switches 8 and 9, contact 10 and wire 12 through the winding of a relay 13 and thence to ground at 14. This relay has an armature 15 which, when attracted, engages a contact 16 connected with the wire 6.

From the armature 15 extends a wire 17, connected with wires 18 and 18' which in turn are connected with the high beam filaments 1 and 1' of the headlights.

A wire 20 extends from contact 11 through the winding of a second relay 19. This relay has an armature 21 which, when attracted engages a contact 22, connected by wire 23 with wire 7. From the armature 21 extends a wire 24, connected by wires 25 and 25' with the low beam filaments 2 and 2', respectively.

It will be understood that the relays 13 and 19 above described, constitute part of the standard equipment commonly employed on automobiles at the present time, and that these relays are operated by the tilt switch 9 to control the high and low beam filaments of the headlights in a well known manner. In fact all of the elements so far described constitute part of the standard lighting system with which cars are usually equipped.

The present invention comprises the insertion in conductors 18 and 18' and 25 and 25' of relays 26 and 26' and 27 and 27', respectively.

The relay 26 is provided with an armature 28 which, when the relay is de-energized, is moved by a spring into engagement with a contact 28a, connected by wire 30 with a filament 31 of a special signal light mounted at the front of the automobile adjacent one of the headlights. Similarly, the relay 26' is provided with an armature 34, which, when the relay is de-energized, is moved by a spring into engagement with a contact 34a connected by wire 30' with a filament 31' of a special signal lamp mounted adjacent the other headlight.

It will be noted these filaments 31 and 31' are controlled by relays included in the circuits of the high beam filaments of the headlights.

These signal lights are also provided with other filaments 32 and 32', these latter being joined with the filaments 31 and 31' and the junction points grounded at 33 and 33'.

The relay 27 is provided with an armature 29 which, when the relay is de-energized, is moved by a spring into engagement with a contact 29a, this contact being connected by wires 36 and 37 with the filament 32 of the signal light adjacent the left headlight.

Similarly the relay 27' is provided with an armature 35, which, when the relay is de-energized is moved by a spring into engagement with a contact 35a, connected by wires 36' and 37' with the filament 32' of the signal light adjacent the right headlight.

On the dash are mounted 4 small signal lamps 41, 42, 41' and 42', one side of all of them being connected together and grounded at 43.

The wire 36 connects with the signal lamp 42, and the wire 39 with the signal lamp 41'. A wire 38 connects the wire 30 with the signal lamp 41 and a wire 40 connects the wire 36' with the signal lamp 42'.

The operation of my improved signalling system will be obvious from the foregoing description. Assuming the tilt switch 9 to be in the position shown in the drawing, current will flow through the high beam filaments 1 and 1' of the headlights, such current passing through the relays 26 and 26' and thus holding the armatures 28 and 34 down out of engagement with the contacts 28a and 34a, respectively. Under these conditions none of the signal lamps are energized. Should however the high beam filament of either headlight burn out, relay 26 or 26' will be de-energized and the armature 28 or 34 released, thus engaging the contact 28a or 34a. This closes a circuit from the wire 17 through the filament 31 or 31' of the signal light adjacent the faulty headlight, and the lighting of this signal light will indicate to an approaching motorist the location of the headlight which has failed.

At the same time current will flow through the wire 38 and signal lamp 41, or through wire 39 through signal lamp 41' on the dash, thus lighting one or the other of these lamps and warning the driver that one of the headlights has failed, and indicating to him which particular headlight is out.

If the tilt switch 9 is thrown over into engagement with the contact 11, thus supplying current to the low beam filaments 2 and 2' of the headlights, and one of these filaments should burn out similar signals will be given. In this case the relays 27 and 27' will be de-energized and will thus serve to direct current through the filaments 32 or 32' of the signal lights, and at the same time through wires 39 or 40 and dash signal lamps 41' or 42', thus indicating to the driver which of the low beam filaments has failed.

While I have described the operation of the signal lamps as due to the burning out of the high or low beam filament of the headlights, it will of course be understood that the signals will be given in case of failure of the headlights from any other cause as for example due to the braking of a wire or the blowing of a fuse.

It will thus be seen that I have provided simple and efficient means for automatically indicating both to the driver of a car and to an approaching motorist the fact that one of the headlights is out, and it is thought that the many advantages of the invention will be fully appreciated by those skilled in the art.

What I claim is:

1. In an automobile lighting system having a pair of headlights each provided with high and low beam filaments, the combination with the usual dash switch, and tilt switch for selectively controlling the circuits of the high and low beam filaments, of a single relay in each filament circuit, a signal lamp associated with each headlight and having two filaments, additional high and low beam signal lamps for each headlight on the dash, and means whereby each relay, upon failure of the corresponding high or low beam filament circuit, serves to close a circuit both through one or the other filament of the signal lamp associated with that particular headlight and through the respective additional signal lamp on the dash.

2. In an automobile lighting system, and in combination, a pair of headlights each having high and low beam filaments, circuits controlling said filaments, a pair of signal lamps, one adjacent each headlight, so as to be visible to an oncoming driver, and each having two filaments, and individual high and low beam signal lamps for each headlight, on the dash, a normally open circuit separately connecting each filament of the two signal lamps adjacent said headlights in parallel with the respective dash signal lamp, and means for automatically closing the related one of said last mentioned circuits upon failure of one of the corresponding high or low beam filament circuits.

JOHN R. WAGNER.

REFERENCES CITED

The following references are of record in the file of this patent:

UNITED STATES PATENTS

| Number | Name | Date |
|---|---|---|
| 2,223,251 | Hack | Nov. 26, 1940 |
| 2,352,679 | Annis | July 4, 1944 |
| 2,427,076 | Tabacchi | Sept. 9, 1947 |